7673X
J. Reed,
Making Wooden Pins.
Patented July 22, 1833.
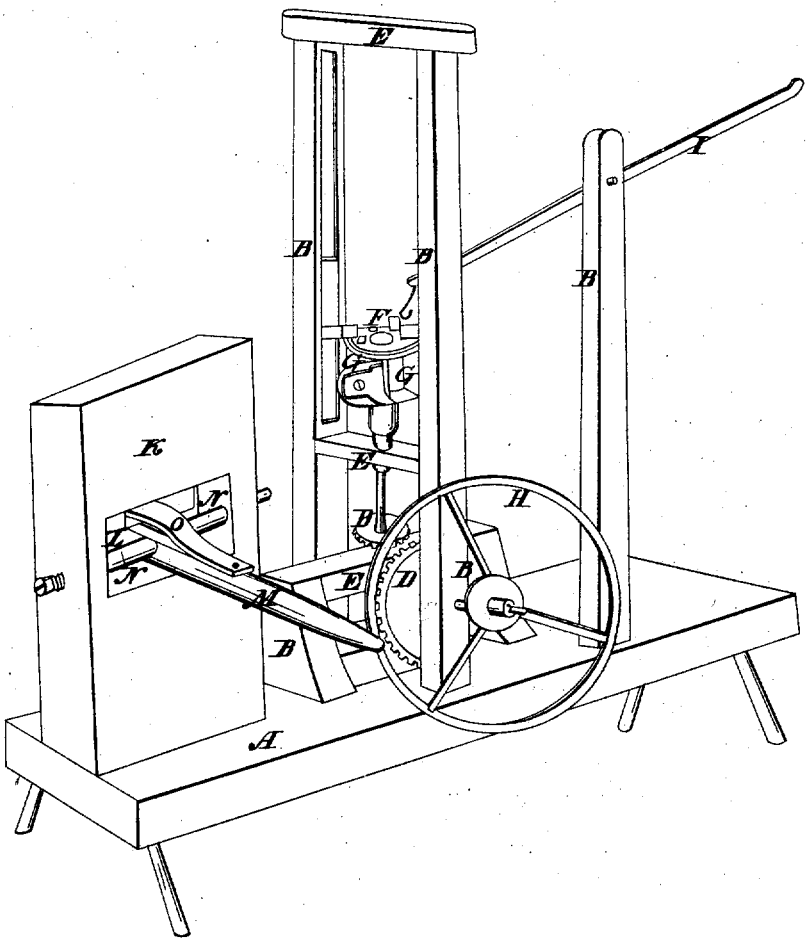
AM. PHOTO-LITHO. CO. N.Y. (OSBORNE'S PROCESS)

X7673 July 22 1833

Jesse Reed
Letters Patent

The schedule referred to in these Letters Patent and mak-
ing part of the same containing a description in the words
of the said Jesse Reed himself of his improvement
called a plug & trunnel geared Machine for Ship
Building. — — To all whom these presents shall come
Be it known that I Jesse Reed of Marshfield in the
County of Plymouth & commonwealth of Massachusetts have
invented a plug & trunnel geared Machine for ship
building & the following is a full and exact description of
the construction and operation of said machine as invented by
me. In the first mode. The principle parts of said ma-
chine consist of a suitable bench or frame, posts, axles, spur
wheels, balance wheel, crank screws & springs. The bench
or frame is four feet in length one foot in width & about
two feet in height. The height of the posts on which the axles
are placed is about fourteen inches above the bench.—
The diameter of the balance wheel is about twenty inches
& weighs about forty pounds. The length of the springs or
arms ~~[illegible]~~ is sixteen inches. The length of the axle on
which said springs or arms are placed is twelve inches, the
diameter is one & a quarter inch made of round iron.—
The length of the other axle is about eighteen inches. On
one end said axle is a crank on the other end is a spur
wheel about twelve inches in diameter which drives a
small wheel about four or six inches in diameter which
is attached to the axle on which the balance wheel is pla-
ced.— Attached to the end of said springs or arms are
two circular boxes about three inches in length the diameter
of the inner circle of said boxes is an inch & a half at one
end & about an inch from the other end is an inch & three eighths eighths & thence to the end the diameter increases to two inches
Attached to one end of said boxes is a chissel or cutter one
side of which is turned up like a gouge by which the
tunnel is reduced from two inches to any size required
said boxes being regulated by a screw that passes thro a
clasp. A Slide is placed on the upper side of said
frame or bench & is made to slide in a direct line with
the axle on which the cutter and balance wheel are pla-
ced. At one end of the Slide is a perpendicular post
having a hole thro' the top. about two inches in diam
eter into which in the operation one end of the tun-
nel is put & is held fast by a lever or screw. This
post may be made in two parts fastened together at the
bottom & brought together with said lever by which
means the tunnel is held. Two hands are necessary
to put this machine in operation. In the second mode.
Said machine consists in a frame or bench axles & gear
similar to the above described, near the centre of the frame
are two perpendicular posts about four feet in height the
space between them is about seven or eight inches.—
The upper part of said posts have a groove about three
quarters of an inch square at the lower end of said groove
is a cross bar & at the top there is another to keep them
firm & steady In said frame there are two other posts
about eight or ten inches in height & about one foot dis-
tant from each other a cross bar is attached to the top of
them; The main axle is about eighteen inches in length
having, a crank at one end and a balance wheel at the
other about three feet in diameter & weighing from eighty
to a hundred weight. This axle passes thro' the first
mentioned posts about six inches above the bench on
said axle & just within the post next the balance wheel
is placed a bevel gear wheel about eight or ten inches

X7673 in diameter which drives a small wheel about half said
diameter which is placed upon a perpendicular axle
about eight or ten inches in length. the upper end hav-
ing a square socket of suitable dimensions to receive the
end of the trunnel. the foot of this axle rests in the cross
bar attached to the short posts. the upper end turns in
the cross bar first mentioned attached to the long posts.
A wheel about seven or eight inches in diameter is
attached to the lower end of two guides one on each side
about six or eight inches in length. which slide perpen-
dicularly in said grooves. said wheel being at right an-
gle with said guides. There is a hole thro the centre of
this wheel in which are placed the end of two circular
boxes. to one of which the cutter is fixed as in the first mode.
These boxes have a flange at right angle which is connec-
ted to said wheel with screws in such a manner as to
make them easily graduated to any size required. the
upper end of said boxes passes thro the hole in the cen-
tre of the wheel. This wheel being raised up by the
lever a button attached to one end of the long posts. is tur-
ned which holds it. A piece of cast iron having a
square of the same size of the socket in said perpendic-
ular spindle. the top end being inverted with a small
knife placed to correspond. is inserted in said socket
& used for the purpose of pointing, the trunnels.
In this mode but one person is required to put the ma-
chine in operation. Attached to said frame is anoth-
er perpendicular post from eighteen to twenty inches
in length. twelve inches in width & from one to two in-
ches in thickness. a little above the centre of this post
is a mortise nine inches in width & two inches in height.
A lever is placed in this mortise having trunnions on
each side. the length of the trunnions is about eight & a
half

162. X7673 half inches the end of them being counter sunk to receive the end of the screws on which the lever is hung. its length being about two & a half feet, the short end being about six inches from the pivots & made to correspond with the shape of the plug required, the end of said lever being turned up to keep the plug from slipping. On the front of said perpendicular post are elevations sufficient to affix two knives or chissels. two inches in width. having their inner edge half an inch the longest. These knives are placed on said elevation, the flat or straight sides inward at the same distance & angles that the plug requires. On the top of said lever is a stout spring made fast. when the lever is raised one end of said spring hits upon a stop. The lever being further raised. it opens the spring sufficient to receive one end of the plug. then the lever is brought back & the plug is driven by the short end of the lever between the knives which takes off a shaven from each side. then being brought back by raising the lever it is turned over & the same operation repeated completes the plug. —
Your petitioner claims the general construction of said machine above described & its application to the making of plugs & trunnels for ship building and rollers and rounds for ploughs excepting a tool now in use for rounding trunnels. In testimony that the above is a true specification of my said machine as above described. I do hereunto set my hand this tenth day of May Anno Domini 1833.

Witnesses

[illegible] Ford Jr.  
William Ford

[illegible] [illegible]

( Dr in part [illegible])

[illegible]
[illegible]

[illegible]